United States Patent
Qian et al.

(10) Patent No.: US 10,289,664 B2
(45) Date of Patent: May 14, 2019

(54) TEXT INPUT METHOD FOR COMPLETING A PHRASE BY INPUTTING A FIRST STROKE OF EACH LOGOGRAM IN A PLURALITY OF LOGOGRAMS

(71) Applicant: LENOVO (Singapore) PTE, LTD., New Tech Park (SG)

(72) Inventors: Ming Qian, Cary, NC (US); Jian Li, Chapel Hill, NC (US); Song Wang, Cary, NC (US); Jianbang Zhang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 171 days.

(21) Appl. No.: 14/939,167

(22) Filed: Nov. 12, 2015

(65) Prior Publication Data
US 2017/0139885 A1    May 18, 2017

(51) Int. Cl.
*G06F 3/01* (2006.01)
*G06F 17/24* (2006.01)
*G06F 17/27* (2006.01)
*G06F 3/0488* (2013.01)

(52) U.S. Cl.
CPC ............. *G06F 17/24* (2013.01); *G06F 3/018* (2013.01); *G06F 3/04883* (2013.01); *G06F 17/276* (2013.01)

(58) Field of Classification Search
CPC ..... G06F 17/276; G06F 3/018; G06F 3/04883
USPC ......................................................... 715/268
See application file for complete search history.

(56) References Cited

U.S. PATENT DOCUMENTS

| | | | | |
|---|---|---|---|---|
| 4,505,602 A * | 3/1985 | Wong | ...................... | G06F 3/018 400/110 |
| 4,897,638 A * | 1/1990 | Kokunishi | ............. | G06K 15/02 345/472 |
| 4,937,745 A * | 6/1990 | Carmon | .................. | G06F 3/018 400/110 |
| 5,187,480 A * | 2/1993 | Thomas | .................. | G06F 3/018 341/22 |
| 5,796,867 A * | 8/1998 | Chen | .................. | G06K 9/00429 382/187 |
| 5,923,321 A * | 7/1999 | Huang | ................... | G09G 5/246 345/441 |
| 6,275,237 B1 * | 8/2001 | Wu | ....................... | G06T 11/203 345/440 |
| 6,970,599 B2 * | 11/2005 | Longe | ..................... | G06F 3/018 382/185 |
| 8,306,356 B1 * | 11/2012 | Bever | .................... | G06K 9/723 382/275 |
| 8,706,802 B1 * | 4/2014 | Dayan | ............... | G06F 17/30905 345/632 |

(Continued)

FOREIGN PATENT DOCUMENTS

CN    1604022 A * 4/2005
CN    101135934 A * 3/2008
(Continued)

*Primary Examiner* — Cesar B Paula
*Assistant Examiner* — Yahao Chen
(74) *Attorney, Agent, or Firm* — Kunzler Bean & Adamson (57) ABSTRACT

For logogram phrase completion from initial strokes, a processor may receive a plurality of initial logogram strokes from an input device. In addition, the processor may identify a logogram phrase based on the plurality of initial logogram strokes.

12 Claims, 10 Drawing Sheets

(56) References Cited

U.S. PATENT DOCUMENTS

| | | | | |
|---|---|---|---|---|
| 8,997,018 | B2* | 3/2015 | Cheng | G06F 3/0482 715/810 |
| 2004/0223644 | A1* | 11/2004 | Meurs | G06F 3/018 382/185 |
| 2004/0239534 | A1* | 12/2004 | Kushler | G06F 3/018 341/28 |
| 2004/0243389 | A1* | 12/2004 | Thomas | G06F 3/018 704/1 |
| 2005/0152600 | A1* | 7/2005 | Chen | G06K 9/222 382/187 |
| 2006/0018545 | A1* | 1/2006 | Zhang | G06F 17/2223 382/185 |
| 2008/0215308 | A1* | 9/2008 | Li | G06F 3/04883 704/3 |
| 2008/0232689 | A1* | 9/2008 | Lee | G06F 17/2223 382/185 |
| 2008/0263015 | A1* | 10/2008 | Qiu | G06F 17/3064 |
| 2010/0246964 | A1* | 9/2010 | Matic | G06K 9/00422 382/185 |
| 2012/0089632 | A1* | 4/2012 | Zhou | G06F 3/018 707/769 |
| 2013/0147809 | A1* | 6/2013 | Luo | G09G 5/28 345/472.3 |
| 2014/0160032 | A1* | 6/2014 | Che | G06F 3/018 345/173 |
| 2014/0253457 | A1* | 9/2014 | Lee | G06F 3/018 345/171 |
| 2016/0104038 | A1* | 4/2016 | Wang | G06K 9/00436 382/189 |
| 2017/0262474 | A1* | 9/2017 | Chen | G06F 17/30253 |

FOREIGN PATENT DOCUMENTS

| | | | | | |
|---|---|---|---|---|---|
| CN | 101157312 | A | * | 4/2008 | |
| CN | 101169686 | A | * | 4/2008 | |
| CN | 101187915 | A | * | 5/2008 | |
| CN | 101256446 | A | * | 9/2008 | |
| CN | 100501648 | C | * | 6/2009 | |
| CN | 101630197 | A | * | 1/2010 | |
| CN | 1862472 | B | * | 5/2010 | G06F 3/018 |
| CN | 101751144 | A | * | 6/2010 | |
| CN | 102169372 | A | * | 8/2011 | |
| CN | 102316380 | A | * | 1/2012 | |
| CN | 104461099 | A | * | 3/2015 | |
| CN | 104571705 | A | * | 4/2015 | G06F 3/018 |
| WO | WO 2006115825 | A2 | * | 11/2006 | G06F 3/018 |
| WO | WO-2011143808 | A1 | * | 11/2011 | G06F 3/018 |

* cited by examiner

| Initial Logogram Stroke Index 255 | Logogram Phrase 260 | Frequency 270 |
|---|---|---|
| Initial Logogram Stroke Index 255 | Logogram Phrase 260 | Frequency 270 |
| Initial Logogram Stroke Index 255 | Logogram Phrase 260 | Frequency 270 |
| Initial Logogram Stroke Index 255 | Logogram Phrase 260 | Frequency 270 |

253 labels each row.

| Stroke ID 210 |
|---|
| Stroke ID 210 |
| Stroke ID 210 |
| Stroke ID 210 |
| Stroke ID 210 |
| Stroke ID 210 |

TEXT INPUT METHOD FOR COMPLETING A PHRASE BY INPUTTING A FIRST STROKE OF EACH LOGOGRAM IN A PLURALITY OF LOGOGRAMS

FIELD

The subject matter disclosed herein relates to logogram phrase completion and more particularly relates to logogram phrase completion from initial strokes.

BACKGROUND

Description of the Related Art

Logograms often include many strokes, increasing the time required to input a logogram on an input device.

BRIEF SUMMARY

An apparatus for logogram phrase completion from initial strokes is disclosed. The apparatus includes an input device, a processor in electrical communication with the input device, and a memory that stores code executable by the processor. The processor may receive a plurality of initial logogram strokes from the input device. In addition, the processor may identify a logogram phrase based on the plurality of initial logogram strokes. A method and a computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
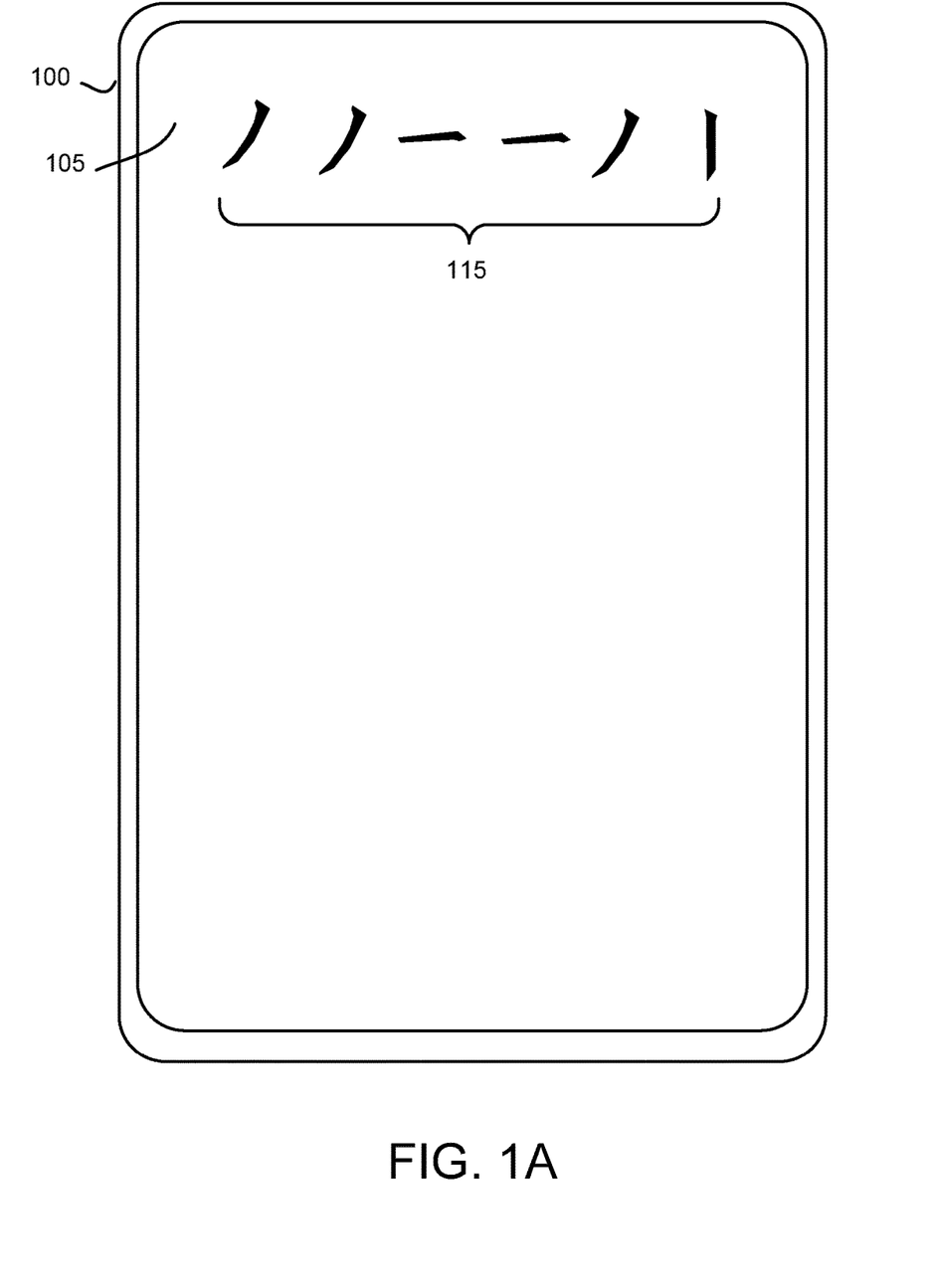
FIG. 1A is a front view drawing illustrating one embodiment of an input device.

FIG. 1A is a front view drawing illustrating one embodiment of an input device 105. In the depicted embodiment, the input device 105 is a touch screen of a tablet computer. Alternatively, the input device 105 may be a keyboard, an audio input, a motion sensor, or the like. A user may enter logograms into the input device 105. The logograms may be Chinese characters, Japanese characters, Korean characters, or the like.

A user may enter logograms using the input device 105, allowing the logograms to be communicated, stored, and manipulated. A logogram is composed of one or more strokes that are made in a specified order. Some logograms include many strokes, and are often similar to other logograms. As a result, entering logograms into an input device 105 has been a time-consuming process.

The embodiments described herein simplify the process of entering logograms into an input device 105 by receiving a plurality of initial logogram strokes 115 and identifying a logogram phrase based on the plurality of initial logogram strokes 115. The input device 105 receives the plurality of initial logogram strokes 115, where each initial logogram stroke is a first stroke of a stroke order for the corresponding logogram. The initial logogram strokes 115 may be generated as written input on the touch screen input device 105. For example, a user may write on the touch screen with a finger or a stylus.

Alternatively, the initial logogram strokes 115 may be received in response to keyboard selections. For example, each key of the keyboard may correspond to a logogram stroke. Pressing a key may generate a corresponding logogram stroke.

Figure 1B:
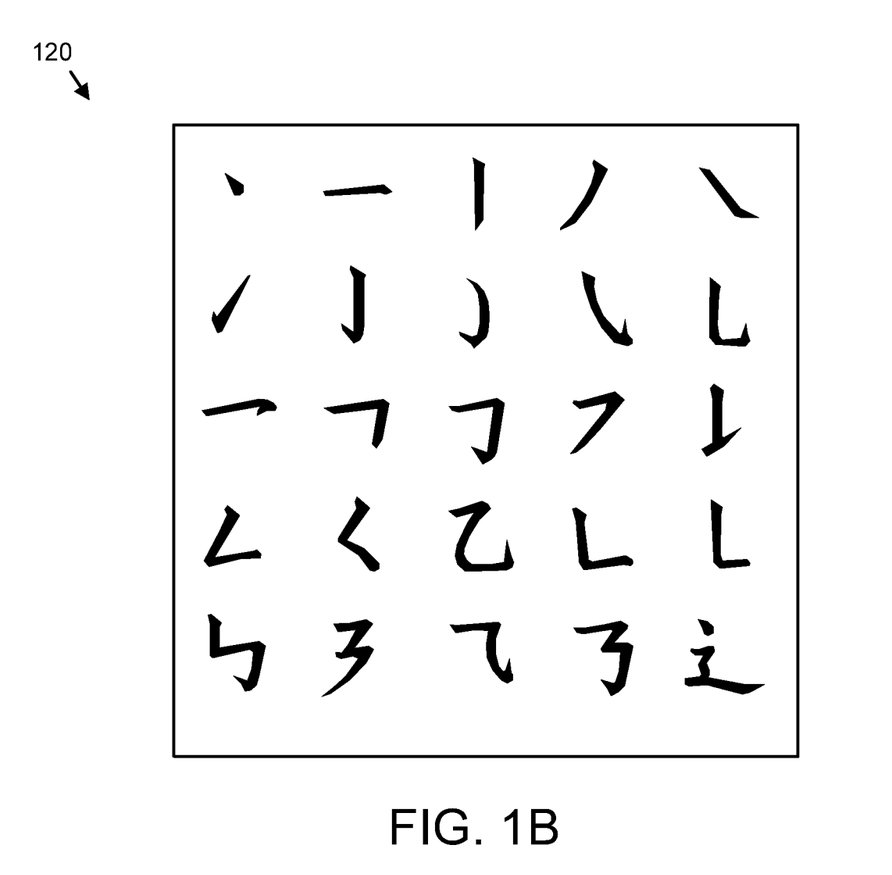
FIG. 1B is a drawing of a standard stroke template.

In one embodiment, the initial logogram strokes 115 are received in response to selections on a standard stroke template, such as is illustrated in FIG. 1B. The input device 105 may display the standard stroke template and the user may tap on the displayed strokes to select the initial logogram strokes 115.

Because only a single initial logogram stroke is required for entering each logogram, the embodiments greatly accelerate the entry of logograms with the input device 105. In addition, because a user is only required to enter the initial logogram stroke, the user need not remember, or enter, all of the strokes of a logogram in order to enter the logogram.

FIG. 1B is a drawing of a standard stroke template 120. The standard stroke template 120 may be displayed on the input device 105. A user may tap a stroke to enter that stroke is an initial logogram stroke on the input device 105. In one embodiment, tapping a stroke may generate the stroke identifier for the stroke.

Figure 2A:
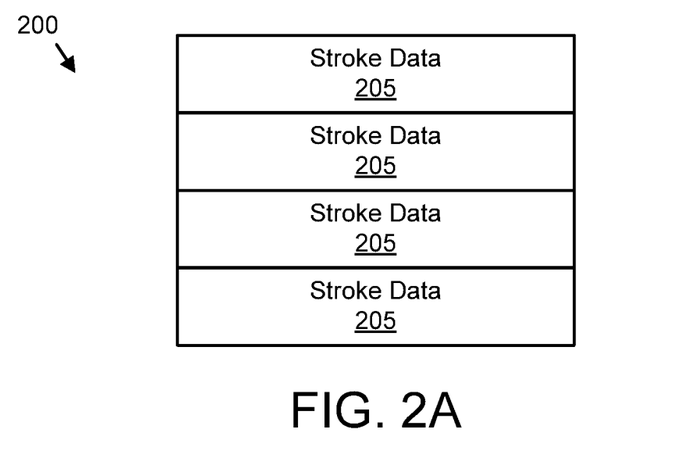
FIG. 2A is a schematic block diagram illustrating one embodiment of a stroke database.

FIG. 2A is a schematic block diagram illustrating one embodiment of the stroke database 200. The stroke database 200 maybe organized as one or more data structures in a memory. The stroke database 200 includes stroke data 205 for each of a plurality of strokes that are used to form logograms.

Figure 2B:
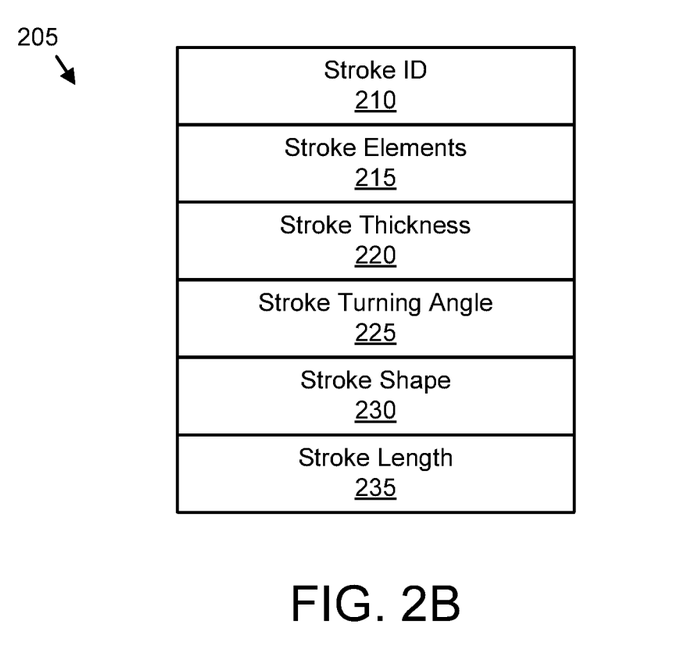
FIG. 2B is a schematic block diagram illustrating one embodiment of stroke data.

FIG. 2B is a schematic block diagram illustrating one embodiment of the stroke data 205. The stroke data 205 maybe organized as data structures in a memory. Each entry of stroke data 205 may describe a single logogram stroke. In the depicted embodiment, the stroke data 205 includes a stroke identifier 210, stroke elements 215, a stroke thickness 220, a stroke turning angle 225, a stroke shape 230, and a stroke length 235.

The stroke identifier 210 may uniquely identify the logogram stroke. In one embodiment, the stroke identifier 210 is an index value. The stroke elements 215 may describe elements that comprise the logogram stroke. For example, if the logogram stroke comprises two distinct elements, the stroke elements 215 may describe each element.

The stroke thickness 220 may describe a line thickness along the logogram stroke. The stroke turning angle 225 may describe one or more angles along the logogram stroke. The stroke shape 230 may describe the shape of the logogram stroke. The stroke length 235 may describe the length of the logogram stroke.

Figure 2C:
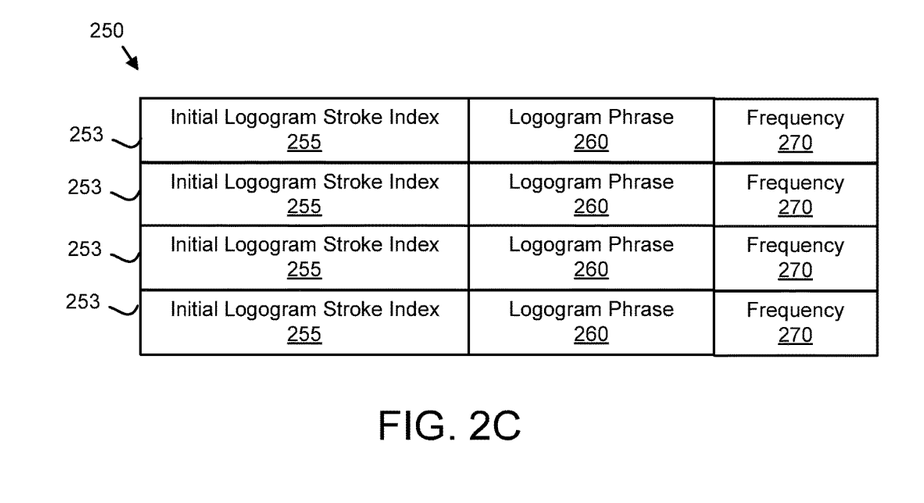
FIG. 2C is a schematic block diagram illustrating one embodiment of a logogram phrase database.

FIG. 2C is a schematic block diagram illustrating one embodiment of a logogram phrase database 250. The logogram phrase database 250 may be organized as a data structure in a memory. In the depicted embodiment, the logogram phrase database 250 includes a plurality of logogram phrase database entries 253. Each logogram phrase database entry 253 may include an initial logogram stroke index 255, a corresponding logogram phrase 260, and a frequency 270.

The logogram phrase 260 comprises two or more logograms. The logograms may form a common phrase. The initial logogram stroke index 255 may represent each initial logogram stroke for the logograms in the logogram phrase 260. In one embodiment, the initial logogram stroke index 255 comprises a hash of each initial logogram stroke for the logograms in a logogram phrase 260.

In a certain embodiment, the frequency 270 indicates the selection frequency for which a logogram phrase 260 is selected for a given initial logogram stroke index 255. Multiple logogram phrases 260 will have an initial logogram stroke index 255 with an identical value or representation. The frequency 270 may indicate a likelihood that a user intends and will select the corresponding logogram phrase 260 in response to entering the initial logogram strokes of the initial logogram stroke index 255. The frequency 270 may be used to order the logogram phrases 260 in a hint list and/or to automatically select a logogram phrase 260 as will be described hereafter.

Figure 2D:
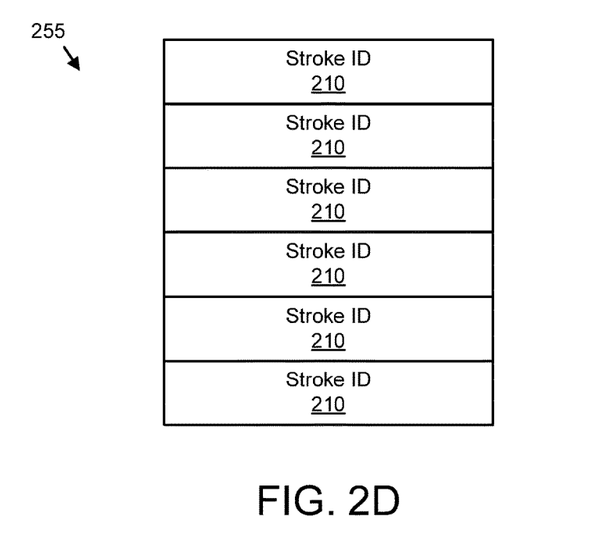
FIG. 2D is a schematic block diagram illustrating one embodiment of an initial logogram stroke index.

FIG. 2D is a schematic block diagram illustrating one embodiment of an initial logogram stroke index 255. Each initial logogram stroke index 255 maybe organized as a data structure in a memory. The initial logogram stroke index 255 may include a plurality of stroke identifiers 210 in a specified order. The stroke identifiers 210 may be hashed to form an index value.

Figure 2E:
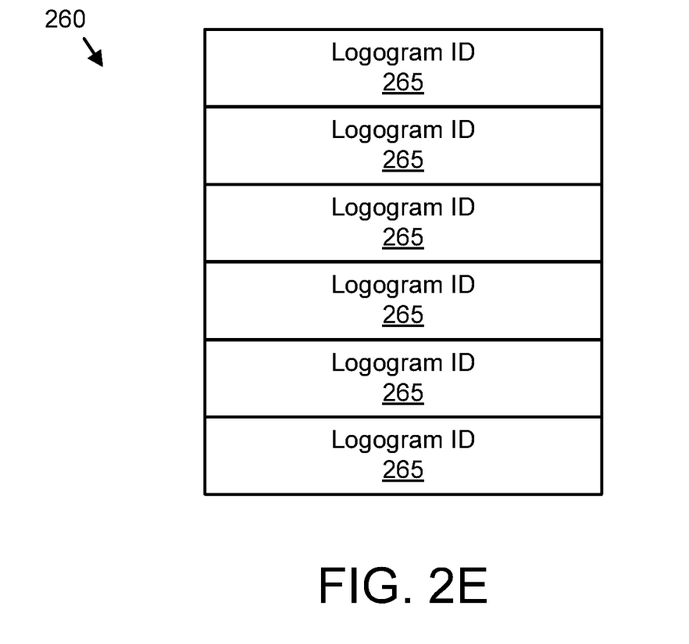
FIG. 2E is a schematic block diagram illustrating one embodiment of logogram phrases.

FIG. 2E is a schematic block diagram illustrating one embodiment of a logogram phrase 260. The logogram phrase 260 maybe organized as a data structure in a memory. The logogram phrase 260 may include a plurality of logogram identifiers 265 in a specified order. Each logogram identifier 265 may identify a logogram. In one embodiment, each logogram identifier 265 is a CJK (Chinese, Japanese, and Korean) Unicode value.

Figure 3A:
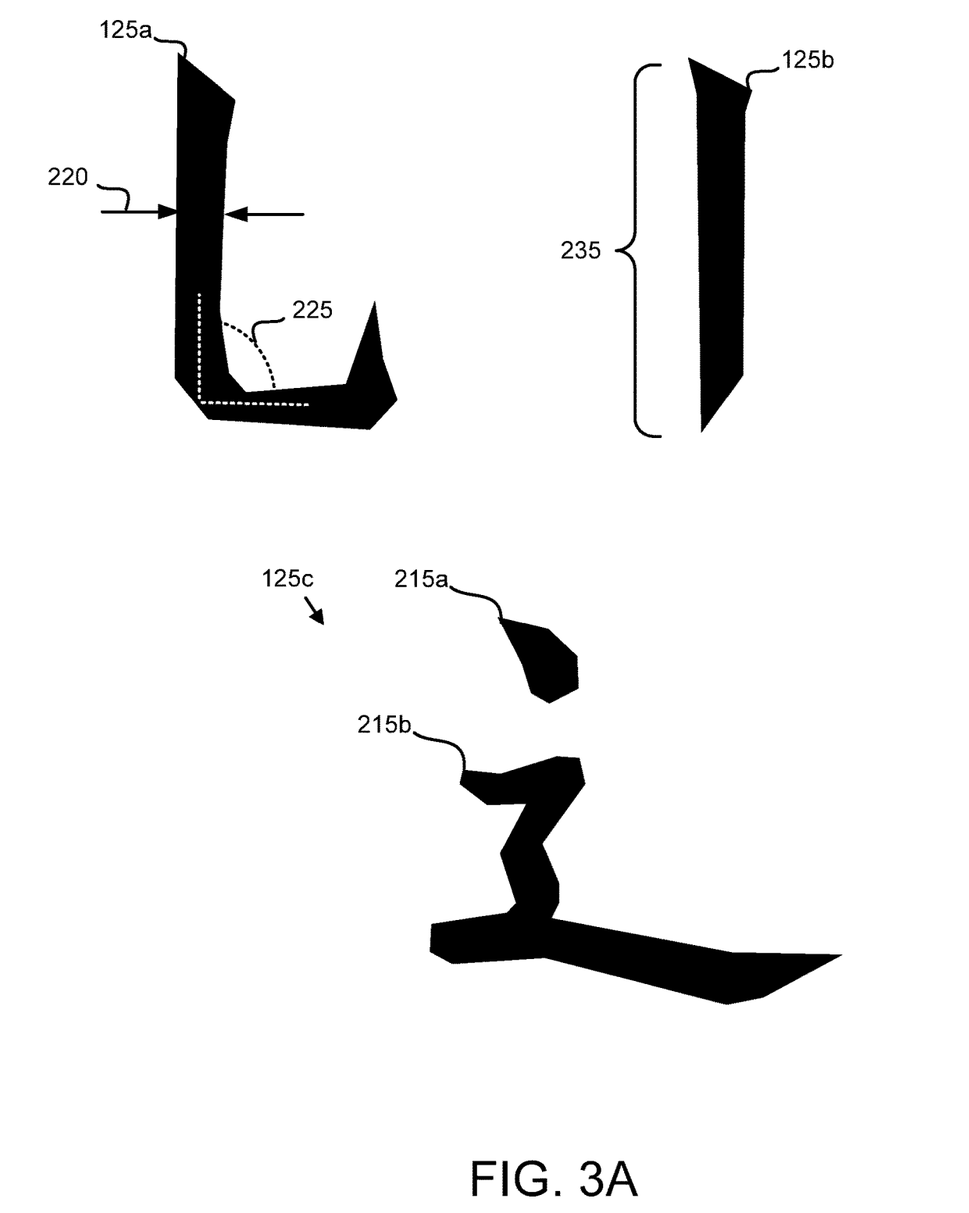
FIG. 3A is a drawing illustrating one embodiment of stroke characteristics.

FIG. 3A is a drawing illustrating one embodiment of stroke characteristics for logogram strokes 125. 3 logogram strokes 125 are depicted. The stroke thickness 220, stroke turning angle 225, stroke shape 230, and stroke length 235 are illustrated relative to the logogram strokes 125. A first stroke 125a and a second stroke 125b each include one single stroke element 215. A third stroke 125c includes a first stroke element 215a and a second stroke element 215b.

Figure 3B:
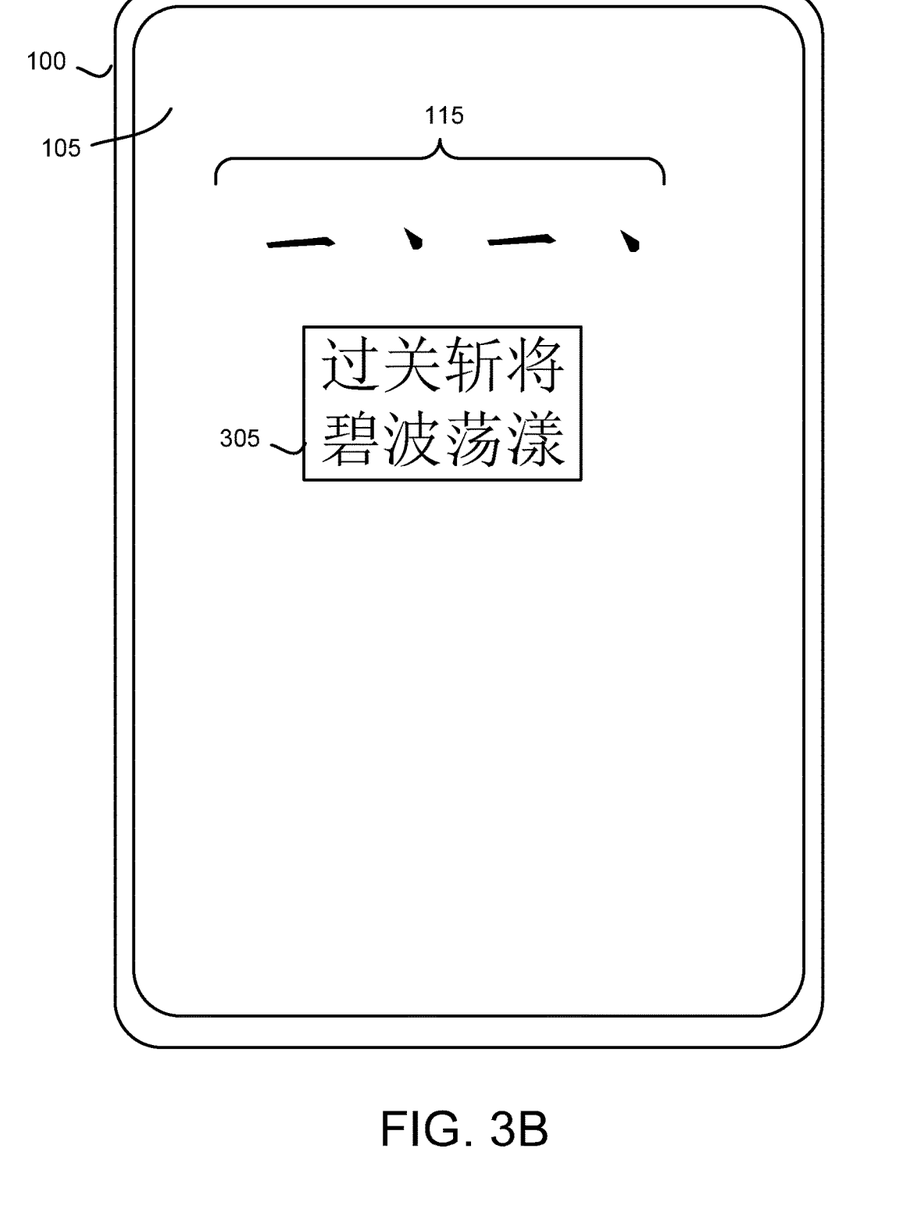
FIG. 3B is a front view drawing illustrating one embodiment of initial logogram strokes and displaying a hint list.

FIG. 3B is a front view drawing illustrating one embodiment of initial logogram strokes 115 and displaying a hint list 305. The tablet computer 100 and input device 105 are shown with a plurality of initial logogram strokes 115 entered on the input device 105. In response to the initial logogram strokes 115, two logogram phrases 260 based on the plurality of initial logogram strokes 115 are displayed in a hint list 305. For simplicity, only two logogram phrases 260 are shown. In one embodiment, all logogram phrases 260 that match the initial logogram strokes 115 are displayed. Alternatively, logogram phrases 260 with a frequency 270 that exceed a frequency threshold may be displayed. A user may select one of the logogram phrases 260 and the selected logogram phrase 260 may be displayed as a displayed logogram phrase.

Figure 3C:
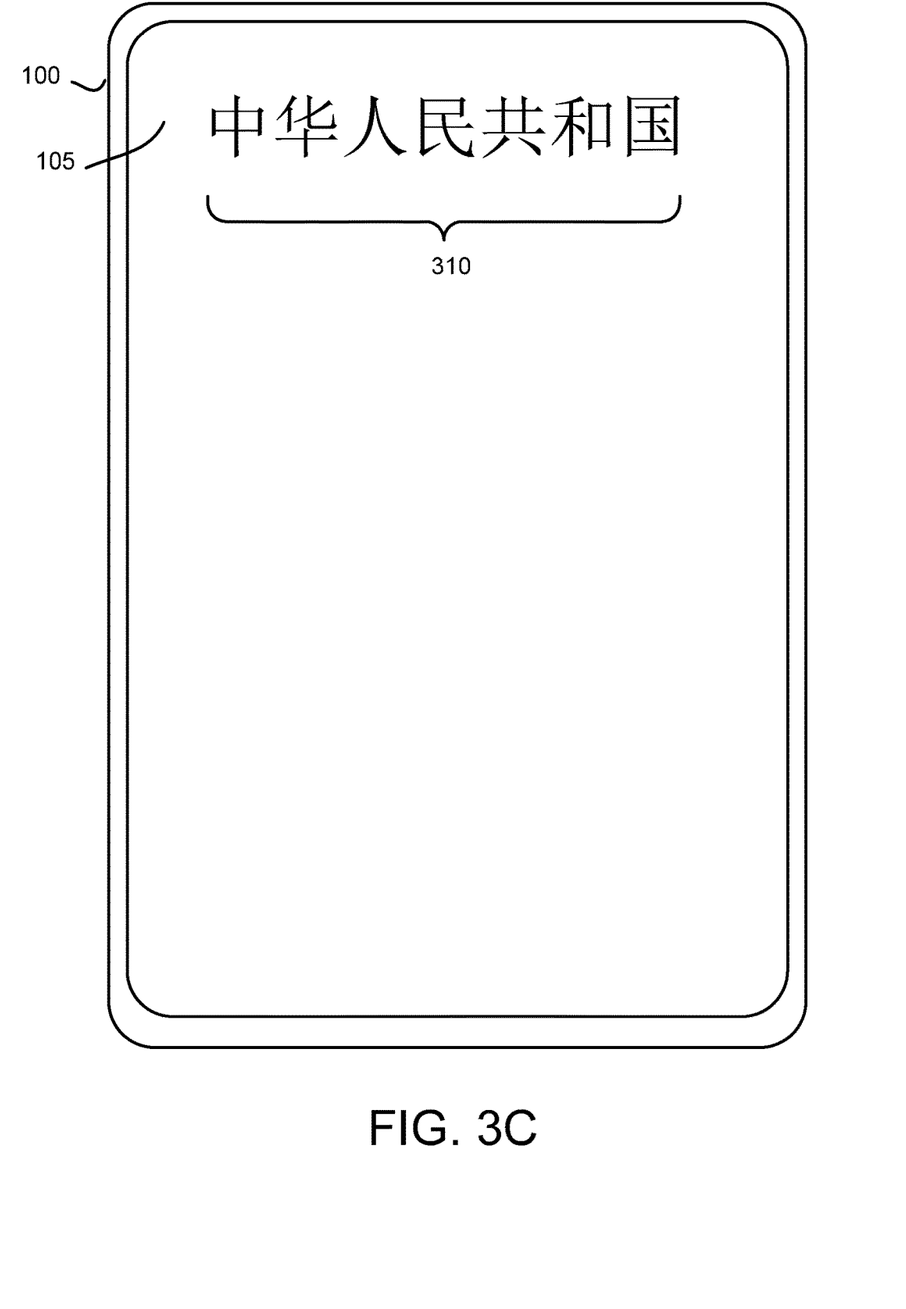
FIG. 3C is a front view drawing illustrating one embodiment of displaying a logogram phrase.

FIG. 3C is a front view drawing illustrating one embodiment of a displayed logogram phrase 310 that is automatically displayed in response to the plurality of initial logogram strokes 115 of FIG. 1A. The displayed logogram phrase 310 may be selected and displayed without presenting the hint list 305 and/or receiving a selection from the hint list 305. In one embodiment, the displayed logogram phrase 310 is the only logogram phrase 260 that corresponds to the plurality of initial logogram strokes 115. Alternatively, the displayed logogram phrase 310 may have a frequency 270 that exceeds a frequency threshold.

Figure 4:
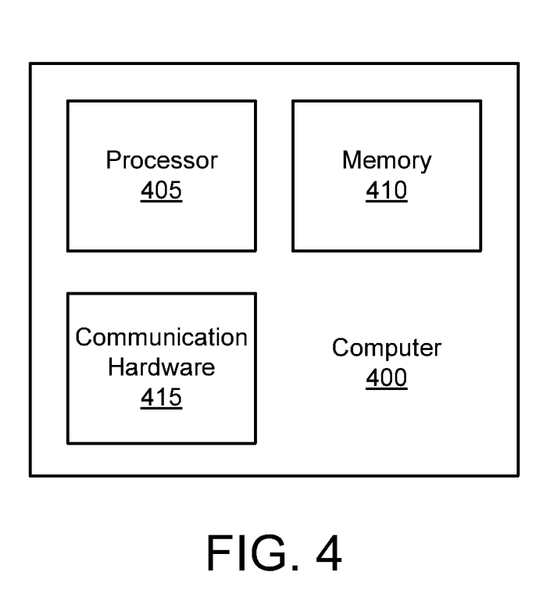
FIG. 4 is a schematic block diagram illustrating one embodiment of a computer.

FIG. 4 is a schematic block diagram illustrating one embodiment of a computer 400. The computer 400 may be embodied in the tablet computer 100. In the depicted embodiment, the computer 400 includes a processor 405, a memory 410, and communication hardware 415. The memory 410 may include a semiconductor storage device, a hard disk drive, an optical storage device, a micromechanical storage device, or combinations thereof. The memory 410 may store code. The processor 405 may execute the code. The communication hardware 415 may communicate with other devices.

Figure 5:
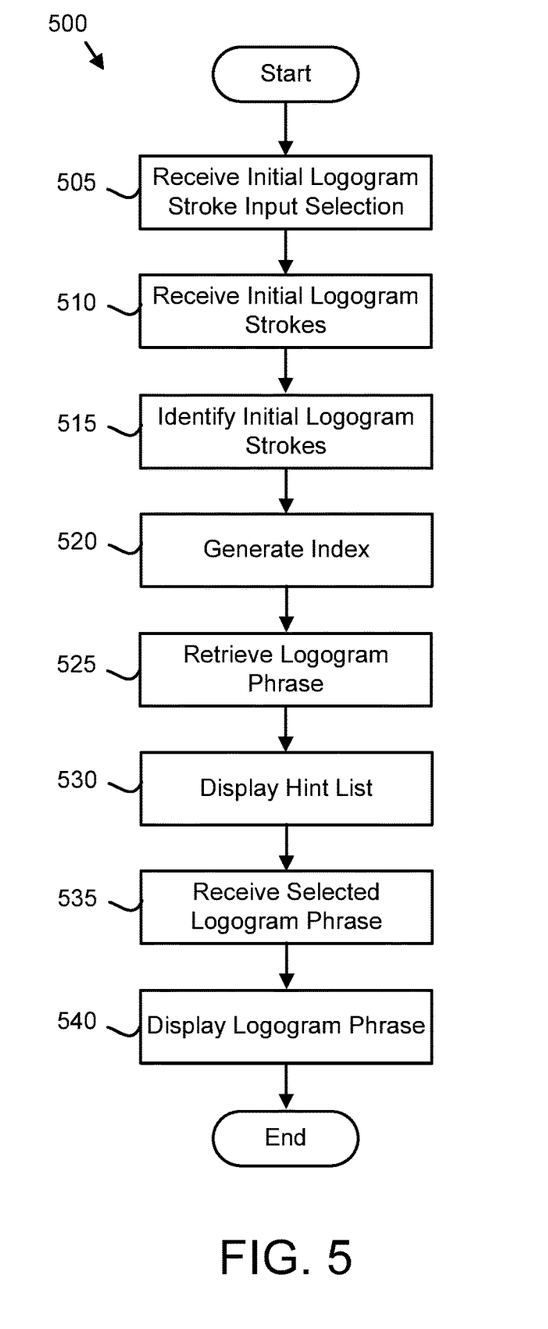
FIG. 5 is a schematic flow chart diagram illustrating one embodiment of a logogram phrase completion method.

FIG. 5 is a schematic flow chart diagram illustrating one embodiment of a logogram phrase completion method 500. The method 500 may complete and display a logogram phrase 310 in response to a plurality of initial logogram strokes 115. The method 500 may be performed by the processor 405. Alternatively, the method 500 may be performed by a computer readable storage medium such as the memory 410. The computer readable storage medium may store code that is executed by the processor 405 to perform the method 500.

The method 500 starts, and in one embodiment, the computer 105 receives 505 an initial logogram stroke input selection. The initial logogram stroke input selection indicates that displayed logogram phrases 310 should be generated from initial logogram strokes 115. A user may make the initial logogram stroke input selection through the input device 105. Alternatively, the computer 400 may make the initial logogram stroke input selection in response to detecting the plurality of initial logogram strokes 115 without subsequent strokes for each logogram.

The input device 105 may receive 510 a plurality of initial logogram strokes 115. The initial logogram strokes 115 may be written on a touch screen input device 105, entered his keystrokes on a keyboard, selected from the standard stroke template 120, or the like.

The computer 400 may identify 515 the plurality of initial logogram strokes 115. In one embodiment, each initial logogram stroke 115 is identified 515 using one or more of the stroke thickness 220, stroke turning angle 225, stroke shape 230, and/or stroke length 235. In addition, an initial logogram stroke 115 may be identified 515 from one or more stroke elements 215 and/or the stroke identifier 210 from the standard stroke template 120.

The computer 400 may generate 520 the initial logogram stroke index 255 from the plurality of initial logogram strokes 115. In one embodiment, the initial logogram stroke index 255 may be generated 520 by concatenating the stroke identifiers 210 for each initial logogram stroke 115 in the order in which each initial logogram stroke 115 is received. In addition, the initial logogram stroke index 255 may be generated 520 by hashing the stroke identifiers 210.

In one embodiment, the computer 400 retrieves 525 one or more logogram phrases 260 from the logogram phrase database 250 in response to the initials logogram stroke index 255. The computer 400 may further display 530 a hint list 305 comprising the one or more logogram phrases 260. In one embodiment, the hint list 305 is displayed 530 if two or more logogram phrases 260 are retrieved 525 from the logogram phrase database 250.

Alternatively, the computer 400 may not display 530 the hint list 305 if only one logogram phrase 260 is retrieved 525 from the logogram phrase database 250. In addition, the computer 400 may not display 530 the hint list 305 if the frequency 270 for one of the logogram phrases 260 exceeds the frequency threshold.

If the hint list 305 is displayed 530, the input device 105 may receive 535 a selected logogram phrase 260 from the logogram phrases 260 of the hint list 305. The computer 400 may display 540 the selected logogram phrase 260 as the displayed logogram phrase 310 and the method 500 ends. In a certain embodiment, if only one logogram phrase 260 is retrieved 525 from the logogram phrase database 250 and/or if the frequency 270 for one of the logogram phrases 260 exceeds the frequency threshold, the computer 400 may automatically display 540 that logogram phrase 260 as the displayed logogram phrase 310.

The embodiments receive the plurality of initial logogram strokes 115 and identify a logogram phrase 260 based on the plurality of initial logogram strokes 115. As a result, a logogram phrase 260 may be identified from only a few initial logogram strokes 115. In a certain embodiment, the logogram phrase 260 is identified only from the initial logogram strokes 115. Thus the logogram phrase 260 may be identified without the input of other logogram strokes such as second and third logogram strokes in a logogram stroke sequence. As a result, the logogram phrase 260 may be entered into the input device 105 with fewer strokes, resulting in faster and more accurate entry of logograms.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an input device;
a processor in electrical communication with the input device;
a memory that stores code executable by the processor to:
receive an initial logogram stroke input selection indicating that a displayed logogram phrase is generated from a plurality of initial logogram strokes;
receive the plurality of initial logogram strokes from the input device, wherein each initial logogram stroke comprises only a first stroke of a stroke order for a corresponding logogram;
identify stroke identifiers for each initial logogram stroke of the plurality of initial logogram strokes based on a stroke element a stroke thickness, a stroke turning angle, a stroke shape, and a stroke length for each initial logogram stroke, wherein the stroke turning angle describes one or more angle along the initial logogram stroke;
generate an initial logogram stroke index comprising the stroke identifiers for each of the plurality of initial logogram strokes concatenated in an order of the initial logogram strokes;
retrieve one or more logogram phrases based on the initial logogram stroke index;
in response to two or more logogram phrases being retrieved and a frequency of each of the two or more logograms not exceeding a frequency threshold, display a hint list comprising the two or more retrieved logogram phrases and display a selected logogram phrase from the hint list as the displayed logogram phrase; and in response to the frequency of one retrieved logogram phrase exceeding the frequency threshold, select and display the one retrieved logogram phrase as the displayed logogram phrase without displaying the hint list.

2. The apparatus of claim 1, wherein the one or more logogram phrases are retrieved from a logogram phrase database using the initial logogram stroke index.

3. The apparatus of claim 1, wherein the plurality of initial logogram strokes are received in response to selections on a standard stroke template.

4. The apparatus of claim 1, wherein the plurality of initial logogram strokes are received in response to keyboard selections.

5. The apparatus of claim 1, wherein the input device is a touch screen and the plurality of initial logogram strokes are received in response to written input on the input device.

6. A method comprising:
receiving, by use of a processor, an initial logogram stroke input selection indicating that a displayed logogram phrase is generated from a plurality of initial logogram strokes;
receiving, the plurality of initial logogram strokes, wherein each initial logogram stroke comprises only a first stroke of a stroke order for a corresponding logogram;
identifying stroke identifiers for each initial logogram stroke of the plurality of initial logogram strokes based on a stroke element, a stroke thickness, a stroke turning angle, a stroke shape, and a stroke length for each initial logogram stroke, wherein the stoke turning angle describes one or more angles along the initial logogram stroke,
generating an initial logogram stroke index comprising the stroke identifiers for each of the plurality of initial logogram strokes concatenated in an order of the initial logogram strokes; and
retrieving one or more logogram phrases based on the initial logogram stroke index;
in response to two or more logogram phrases being retrieved and a frequency of each of the two or more logograms not exceeding a frequency threshold, displaying a hint list comprising the two or more retrieved logogram phrases and displaying a selected logogram phrase from the hint list as the displayed logogram phrase; and
in response to the frequency of one retrieved logogram phrase exceeding the frequency threshold, selecting and displaying the one retrieved logogram phrase as the displayed logogram phrase without displaying the hint list.

7. The method of claim 6, wherein the one or more of logogram phrases are retrieved from a logogram phrase database using the initial logogram stroke index.

8. The method of claim 6, wherein the plurality of initial logogram strokes are received in response to selections on a standard stroke template.

9. The method of claim 6, wherein the plurality of initial logogram strokes are received in response to keyboard selections.

10. The method of claim 6, wherein the plurality of initial logogram strokes are received in response to written input on an input device.

11. A program product comprising a non-transitory computer readable storage medium that stores code executable by a processor, the executable code comprising code to perform:
receive an initial logogram stroke input selection indicating that a displayed logogram phrase is generated from a plurality of initial logogram strokes;
receiving the plurality of initial logogram strokes, wherein each initial logogram stroke comprises only a first stroke of a stroke order for a corresponding logogram;
identify stroke identifiers for each initial logogram stroke of the plurality of initial logogram strokes based on a stroke element, a stroke thickness, a stroke turning angle, a stroke shape, and a stroke length for each initial logogram stroke, wherein the stroke turning angle describes one or more angles along the initial logogram stroke;
generate an initial logogram stroke index comprising the stroke identifiers for each of the plurality of initial logogram strokes concatenated in an order of the initial logogram strokes;
retrieve one or more logogram phrases based on the initial logogram stroke index;
in response to two or more logogram phrases being retrieved and a frequency of each of the two or more logograms not exceeding a frequency threshold, display a hint list comprising the two or more retrieved logogram phrases and display a selected logogram phrase from the hint list as displayed logogram phrase; and
in response to the frequency of one retrieved logogram phrase exceeding the frequency threshold, select and display the one retrieved logogram phrase as the displayed logogram phrase without displaying the hint list.

12. The program product of claim 11, wherein the one or more logogram phrases are retrieved from a logogram phrase database using the initial logogram stroke index.

* * * * *